US009380097B2

(12) United States Patent
Barak et al.

(10) Patent No.: US 9,380,097 B2
(45) Date of Patent: Jun. 28, 2016

(54) OVERCOMING DATA LOSS IN STREAMING VIDEO IN IP NETWORKS

(71) Applicant: Gamefly Israel Ltd., Caesarea (IL)

(72) Inventors: Asaf Barak, Yokneam Illit (IL); Tomer Hotlzman, Haifa (IL); Shai Doron, Megiddo (IL)

(73) Assignee: Gamefly Israel Ltd., Caesarea (IL)

( * ) Notice: Subject to any disclaimer, the term of this patent is extended or adjusted under 35 U.S.C. 154(b) by 1 day.

(21) Appl. No.: 14/231,825

(22) Filed: Apr. 1, 2014

(65) Prior Publication Data

US 2015/0281306 A1 Oct. 1, 2015

(51) Int. Cl.
| | |
|---|---|
| H04N 7/173 | (2011.01) |
| H04L 29/06 | (2006.01) |
| H04N 21/24 | (2011.01) |
| H04N 21/266 | (2011.01) |
| H04N 21/442 | (2011.01) |
| H04N 21/6375 | (2011.01) |
| H04N 21/6547 | (2011.01) |
| H04N 21/658 | (2011.01) |

(52) U.S. Cl.
CPC ............. *H04L 65/604* (2013.01); *H04L 65/80* (2013.01); *H04N 21/2402* (2013.01); *H04N 21/266* (2013.01); *H04N 21/44209* (2013.01); *H04N 21/6375* (2013.01); *H04N 21/6547* (2013.01); *H04N 21/6582* (2013.01)

(58) Field of Classification Search
CPC ...................... H04N 7/17318; H04N 7/17336
USPC ..................................................... 725/93–95
See application file for complete search history.

(56) References Cited

U.S. PATENT DOCUMENTS

2013/0058394 A1* 3/2013 Nilsson et al. ........... 375/240.02

OTHER PUBLICATIONS

U.S. Appl. No. 13/898,150, filed May 20, 2013, Asaf Barak.

* cited by examiner

*Primary Examiner* — Hunter B Lonsberry
(74) *Attorney, Agent, or Firm* — Morrison & Foerster LLP (57) ABSTRACT

A computer-implemented method, apparatus and computer program product for overcoming data loss in streaming video in IP networks. The method comprising: receiving by a computing device associated with a server transmitting video, one or more notifications from a client, each notification related to a missing packet or a corrupted frame, wherein the packet or the frame are to be received by the client; determining a situation based upon the notifications; and subject to the situation being a first situation, transmitting to the client an indication that the client is to transmit to the server notifications of a first type, and subject to the situation being a second situation, transmitting to the client an indication that the client is to transmit to the server notifications of a first type and of a second type.

14 Claims, 3 Drawing Sheets

OVERCOMING DATA LOSS IN STREAMING VIDEO IN IP NETWORKS

TECHNICAL FIELD

The present disclosure relates to media streaming in general, and to a method and apparatus for overcoming data loss in media streaming, in particular.

BACKGROUND

Streaming media relates to constant delivery of media by a provider, to be received by an end unit and presented to an end-user.

Streaming may be used for any type of information such as data, audio or video, and content such as music, movies, games, closed captioning, stock ticker, real-time text, medical operations, or any other data to be streamed or broadcast. Common environments or applications of streaming media include but are not limited to interactive television information systems such as video on-demand (VoD) providing pre-ready contents or games, and internet television.

Streaming media has become more and more popular due to a number of reasons, including the increased network bandwidth, especially in the last mile, increased access to and commercialization of networks, especially the Internet, and the use of standard protocols and formats, such as TCP/IP, HTTP, and HTML.

A media stream can be streamed either live or on-demand. Live streams are generally provided by a means called "true streaming", which sends the information without saving the file to a hard disk. On-demand streaming may be provided by a means called progressive streaming or progressive download, which saves the file to a hard disk and then plays it from that location. On-demand streams may be saved to hard disks and servers for extended amounts of time, while the live streams are only generated and available at one time e.g., during an interactive game, a broadcast game or others.

An architecture for live or on-demand services in systems such as but not limited to cable television (CATV) systems may include a plurality of sources, such as files, game servers or others which retrieve or render a sequence of frames; optionally one or more encryption engines, for encrypting the streamed frames; and one or more edge devices, each of which packetizes sub-sets of input streams into a multi program/service transport stream (MPTS) format, modulates each MPTS through a quadrature amplitude modulation (QAM), and transmits the radio frequency (RF) modulated signal to the set top box at the client's premises.

In order to save transmission time, the data may be compressed prior to sending, and decompressed by the client device. The selected type of compression and streaming may be based on the types of the data, the clients and the communication channels.

For example, audio streams may be compressed using an audio codec such as MP3, Vorbis or AAC, while video streams may be compressed using a video codec such as H.264/MPEG-4 or VP8. The stream may be delivered from a streaming server to a streaming client using a transport protocol, such as MMS or RTP. The streaming client may interact with the streaming server using a control protocol, such as MMS or RTSP.

Traditionally, transmitting TV services over IP networks is considered less reliable then transmission over cable network. The reliability of the TV service may be measured by several factors, including but not limited to jitter, delay and packet losses, which may be measured by quantity and/or frequency.

It will be appreciated that the loss of even a single packet, or a corruption of a frame or a part thereof may have large impact on the video quality at the client or subscriber side, for example at the set top box (STB). For example, when H.264/MPEG-4 compression is used, a frame may be expressed relatively to a previous frame, e.g., indicating only the changes from the previous frame. Thus, if a frame is lost, subsequent frames may be useless as well.

Overcoming data loss Transmitting TV services over IP networks in the problems may be performed using a number of approaches.

A preventive approach relates to hardening the video data to embed built-in resiliency to loss of data. For example, ES techniques of H264 standard, may include any one or more of the following: Random and RD control intra refresh (only random is currently supported); mMinimizing/optimizing splice size; Randomizing order of MB transmission; dData partitioning (grouping the data for transmission according to importance for stream correctness); redundant slices; and bitstream switching. In another example, in ProMPEG standard forward error correction (FEC) may be performed. However, such methods have significant drawbacks in terms of transmission volume and optimization options.

BRIEF SUMMARY

One exemplary embodiment of the disclosed subject matter is a computer-implemented method performed by a computerized device, comprising receiving by a computing device associated with a server transmitting video, one or more notifications from a client, each notification related to a missing packet or a corrupted frame, wherein the packet or the frame are to be received by the client; determining a situation based upon the notifications; and subject to the situation being a first situation, transmitting to the client an indication that the client is to transmit to the server notifications of a first type, and subject to the situation being a second situation, transmitting to the client an indication that the client is to transmit to the server notifications of a first type and of a second type. Optionally, within the method, in the first situation the client is to transmit notifications about corrupted frames, and in the second situation the client is to transmit notifications about corrupted frames and notifications about lost packets. Optionally, within the method, in a third situation the client is not to transmit notifications to the server. Within the method, the third situation is optionally a packet mis-order situation and the client maintains a buffer for handling disordered packets. Optionally, within the method, in a fourth situation the server adjusts transmission bitrate and resolution. Within the method, the first situation is optionally a sporadic packet loss situation and the second situation is continuous packet loss situation. Within the method, a third situation is optionally a packet reordering situation and a fourth situation is a bitrate adaptation situation.

Another exemplary embodiment of the disclosed subject matter is a computer-implemented method performed by a computerized device, comprising: receiving by a computing device associated with a server transmitting video, one or more notifications from a client, each notification related to a missing packet or a corrupted frame; determining a situation based upon the least one notifications; and assuming the situation, and based on the situation, determining a transmission bitrate and resolution of transmission to the client, wherein the situation is selected from the group consisting of:

a packet mis-order situation in which the client maintains a buffer for handling disordered frames; a sporadic packet loss situation in which the client is to transmit notifications about corrupted frames and the server is to transmit intra-refresh of macroblocks; a continuous packet loss situation in which the client is to transmit notifications about corrupted frames and about lost packets and the server is to transmit intra-refresh of macroblocks and the lost packets; and an average bitrate reduction situation in which the server adjusts transmission bitrate and resolution.

Yet another exemplary embodiment of the disclosed subject matter is an apparatus having a processing unit and a storage device, the apparatus comprising: a frame encoding component for encoding frames to be transmitted to a client; a situation determination component for determining a situation, based upon a notification received from a client, the notification related to a missing packet or a corrupted frame; and a client communication component for: transmitting the encoded frames to the client; receiving the notification from the client; subject to the situation being a first situation transmitting to the client an indication that the client is to transmit to the server notifications of a first type, and subject to the situation being a second situation, transmitting to the client an indication that the client is to transmit to the server notifications of a first type and of a second type; and transmitting data to the client upon receiving the notification. Optionally, within the apparatus, in the first situation the client is to transmit notifications about corrupted frames, and in the second situation the client is to transmit notifications about corrupted frames and notifications about lost packets. Optionally, within the apparatus, in a third situation the client is not to transmit notifications to the server. Within the apparatus the third situation is optionally a packet mis-order situation and the client maintains a buffer for handling disordered packets. Optionally, within the apparatus, in a fourth situation the server adjusts transmission bitrate and resolution. Within the apparatus the first situation is optionally a sporadic packet loss situation, and the second situation is continuous packet loss situation. Within the apparatus a third situation is optionally a packet reordering situation and a fourth situation is optionally a bitrate adaptation situation.

Yet another exemplary embodiment of the disclosed subject matter is a computer program product comprising: a non-transitory computer readable medium; a first program instruction for receiving by a computing device associated with a server transmitting video, one or more notifications from a client, each notification related to a missing packet or a corrupted frame, wherein the packet or the frame are to be received by the client; a second program instruction for determining a situation based upon the notifications; and a third program instruction for subject to the situation being a first situation, transmitting to the client an indication that the client is to transmit to the server notifications of a first type, and subject to the situation being a second situation, transmitting to the client an indication that the client is to transmit to the server notifications of a first type and of a second type, wherein said first, second and third, and eighth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need to overcome data loss for video stream transmitted across an over the top (OTT) channel when streaming on demand video from a server, such as a provider's server residing at a data center having access to the public network, to the client, for example the set-top box of an end user. Data loss is particularly problematic when streaming games on demand, in which a significant delay is unacceptable, due to the required short response time, while compromising on the resolution may result in poor video quality accounting for disappointing user experience. Naturally, data loss is to be overcome while paying the least possible price, in terms of bitrate, resolution, and delay.

One technical solution comprises applying a proactive approach to adapting the video stream to sustain good transmission across the channel. A first technique relates to static bitrate adaptation, which addresses the case of insufficient line-rate by measuring the actual bandwidth of the channel and setting the cloud service to operate at adequate video profile, in terms of resolution and bitrate.

Another technical solution comprises applying a reactive approach in which measures are taken when data loss is detected at the client. The solution comprises a state machine wherein each state is associated with a situation and with a range of transmission or receiving qualities or problems.

The transmission rate and quality may be assessed on an on-going basis, and the rate and types of data loss may be determined. Based on the assessment, a situation associated with one of the states in the state machine may be assumed. The term situation may refers to a receiving situation of the client, e.g., to a quality of service as experienced by the client.

Each situation may be associated with a transmission correction scheme, which when applied causes reduces the degradation to the user experience in terms of transmission delay and resolution, under the existing conditions. Each such correction scheme is associated with a communication protocol between the client and the server for recovering the missing data.

When it is determined that a currently used scheme associated with a current severity situation is inadequate, for example since transmission quality or rate has improved or worsened, a different situation may be assumed and a new correction scheme (or no correction scheme) may be applied.

The situation assessment may be done by the client notifying the server about missing frames or packets, and the server assessing the severity of the situation in accordance with the missed data types and the frequency. The server may then instruct the client to send requests of predetermined types for recovering the data.

The situation assessment may be an on-going process in which the server constantly assesses the situations, and provides instructions to the client which notifications to transmit. The server may assess the situation for consecutive periods of time. For example every five seconds, for overlapping periods of time, for example periods of five seconds overlapping in on second, or the like. In some embodiments, the assessment frequency may vary between situations. For example, in more severe situations assessment may be performed at higher frequency than in better situations.

Figure 1:
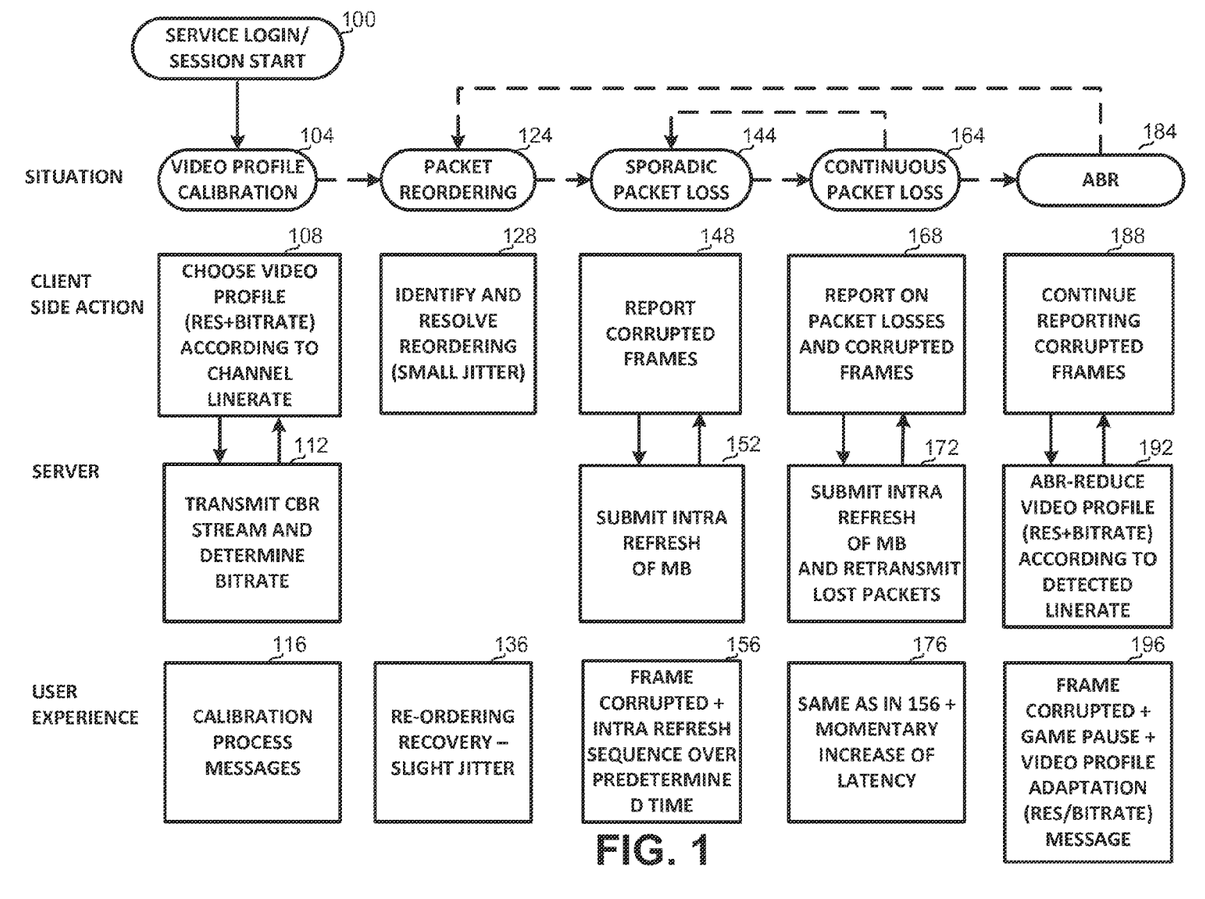
FIG. 1 shows the situations, roles and effects in a system and method for over the top transmission, in accordance with some exemplary embodiments of the disclosed subject matter.

Referring now to FIG. 1, showing the situations, the client-server communication to be applied in each situation, and the transitions between situations.

FIG. 1 shows the situations that may be assumed, including video profile calibration situation 104, packet reordering situation 124, sporadic packet loss situation 144, continuous packet loss situation 164 and ABR situation 184. Each situation may be implemented as a state in a state machine, and the arrows between various situations may represent possible transitions in the state machine.

FIG. 1 comprises initial video profile calibration 104 detailed below.

Another situation is packet reordering situation 124, in which packets arrive from the server to the client in an incorrect order. As long as the mis-order is limited to a small amount of packets, the situation can be resolved by the client keeping a buffer, for example a buffer of between 2 and 5 packets, identifying the packets and reordering them as shown in step 128. This situation can be resolved by the client alone and does not require specific actions on the server side.

The user may experience packet reordering situation 124 and its correction as slight jitter in the transmitted content as disclosed in block 136.

When the mis-order is more significant and cannot be overcome by enlarging the buffer since the missing packet may arrive too late or not arrive at all, the situation may switch to sporadic packet loss situation 144. Sporadic loss situation 144 may relate to situations in which a maximal predetermined number of packet losses events are experienced within a predetermined period of time, for example at most three packet loss events within a timeframe of five seconds. It will be appreciated that a packet loss event may refer to the loss of one or more packets.

In sporadic packet loss situation 144, the client may send "corrupted frame" messages to the server (block 148) upon frames in which packets are missing, and the server may submit intra-block refresh of macro blocks (step 152), as described in U.S. patent application Ser. No. 13/898,150 filed Mar. 20, 2013, incorporated in its entirety and for all purposes. The server may be configured to send macro blocks refresh for a predetermined period of time such as one second for each corrupted frame notification sent by the client.

Sporadic packet loss situation 144 may be experienced by a user as frame corruption followed by intra refresh sequence (block 156), which may seem like video artifacts.

When the number of missing packet events within the predetermined time frame exceeds the allowed number for sporadic packet loss situation 144, a continuous packet loss situation 164 may be assumed. Continuous loss rate may be defined as a loss rate exceeding the rate allowed in sporadic packet loss situation 144, but such that the means detailed below for data recovery limit the corruption at the client decoder to within the defined sporadic rate. In continuous packet loss situation 164, in addition to transmitting "corrupted frame" messages as in sporadic mode (block 148), the client is instructed by the server to transmit to the server a notification related to any lost IP packet, and wait for arrival of the retransmitted packet (block 168). The client may be configured to wait for arrival of retransmitted packets (and thus delay decoding of the data) for up to a predetermined period of time, such as 1.5 to 2 times the round-trip of the channel. If the missing packets do not arrive to the client on time, or do not arrive at all, this may result in video artifacts to the end user. Therefore, the client is also instructed to issue corrupted frames notifications like at sporadic mode.

In a corresponding manner, the server in continuous packet loss situation 164 transmits packets reported as lost (block 172) and intra refresh frame as on block 152.

The client may buffer the received packets before transmitting them to the decoder, such that continuity is maintained if the client has to wait for retransmission of lost packets.

The server, after transmitting a packet, may keep it in a buffer such that if a retransmission notification is received for this packet it may be immediately available.

A user may experience continuous packet loss situation 164 similarly to the experience in the sporadic packet loss situation and possibly also latency resulting from the client waiting for retransmission of lost packets (block 176).

If the situation assessment at the server indicates that the loss rate is relaxed, for example drops to rate acceptable in sporadic packet loss situation 144, the server may notify the client to switch back to sporadic packet loss situation 144 and to notify only corrupted frames.

It will be appreciated that the round-trip latency of the channel used for continuous mode recovery is a characteristic of the line and is measured by the server and passed to the client only when switching to continuous mode. Thus, when switching to continuous mode, the client receives this parameter and uses it (or another time limit based on this measure) as the maximal time for waiting for packet retransmission in order to limit the latency such that it is still adequate for gaming.

While operating in continuous mode this parameter may be fixed and may not be adjusted dynamically to track possible changes in the channel behavior. In other embodiments, such dynamic adaptation can be used if identified to be required.

If the situation assessment by the server indicates that the situation worsens and retransmission of packets (continuous recovery mode) does not clear reoccurrence of 'frame corrupted' messages, video profile calibration situation 184 may be assumed since it may be assumed that the stream bitrate exceeds the effective line-rate of the channel, and average bitrate reduction (ABR) mode may be activated to reduce the bitrate by lowering the video resolution.

Before detailing this situation, video profile calibration situation 104 is explained. Upon service login or session start step 100, which may also occur when switching between games, an initial situation of video profile calibration 104 is assumed. In this situation, the client studies the available channel linerate or noise, and selects an appropriate video profile which balances between an acceptable video quality and rate. In this situation the server may transmit packets at a constant bitrate which may be associated with a stream having a constant bitrate (CBR stream) (block 112), the client may receive the packets, determine missing data and notify it back to the server (block 108). The server may then assume the maximal possible bitrate (block 112), and select the highest possible resolution for this bitrate (block 108).

During video profile calibration 104, the user may be displayed with calibration process messages (block 116).

Referring now back to ABR situation 184. The client may continue notifying about corrupted frames (block 188), while the server may reduce the video profile, comprising the resolution and bitrate in accordance with the detected linerate (block 192).

Similarly to video profile calibration situation 104, in ABR situation 184 the server may transmit a calibration stream for a predetermined period of time such as five seconds to allow the client to notify about corrupted frames such that the server may measure the effective line-rate of the channel and adopt a corresponding bitrate.

The user may experience ABR situation 184 as corrupted frames followed by a pause in the game and may optionally receive a message such as "bitrate adaptation" message.

One technical effect of the disclosure is the provisioning of a method and apparatus for overcoming data losses in Over the Top (OTT) networks. The method and apparatus provide for on-going assessment of the situation and progressive measures for recovery from lost data in video transmission, such that while possible less resource-consuming measures are used, and the more resource-consuming schemes are taken when required.

It will be appreciated that although FIG. 1 shows only certain transitions between situations, other direct transitions between situations may or may not be enabled in accordance with implementation preferences. For example, if packet reordering situation 124 deteriorates beyond a threshold, then continuous packet loss situation may be assumed directly, without trying to first assume sporadic packet loss situation 144. In another example, in ABR situation 184 the bitrate and resolution may be selected so as the buffer used in packet reordering situation 124 may not be sufficient, and sporadic packet loss situation 144 may be assumed immediately.

Figure 2:
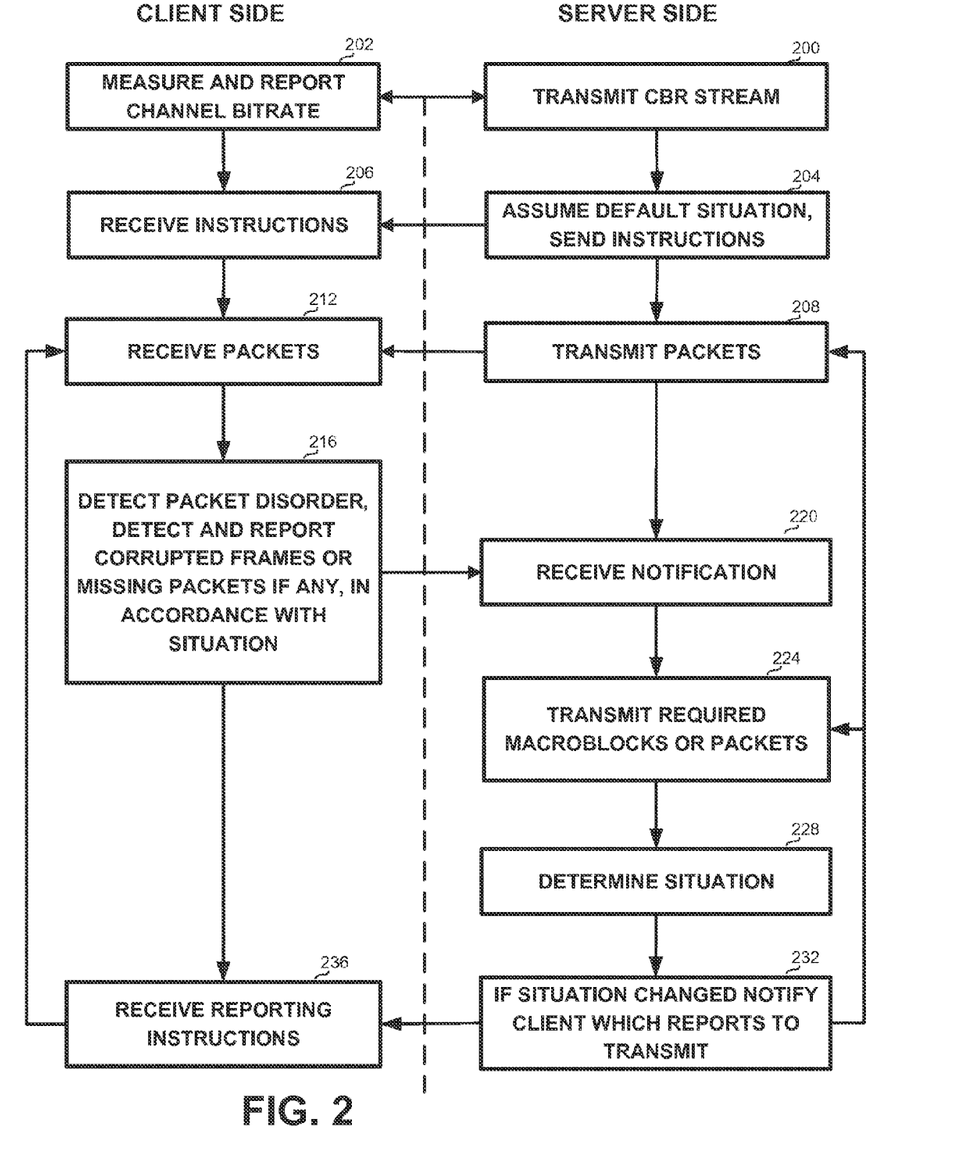
FIG. 2 shows a flowchart diagram of steps in a method for over the top transmission, in accordance with some exemplary embodiments of the disclosed subject matter.

Referring now to FIG. 2, showing a flowchart of steps in a method for video streaming in OTT environments between a client and a server, wherein the server may be associated with a content provider may be a publisher enabling an end user to consume media not by download, a cable or TV operator offering gaming services, a media distribution company or the like.

On step 200, after communication is established between a client and a server, at the beginning of a session such as a gaming session, the server may transmit CBR stream to the client side.

On step 202, the client, such as a set top box (STB) may receive and measure bitrate of a CBR stream and the measurements may be used to determine the video profile that should be used, including but not limited to the bitrate and screen resolution.

On step 204 the server may assume a default situation, such as a packet mis-order situation in which the client does not have to send notifications to the server. The server may send the situation indication and optionally relevant instructions, if any, to the client.

On step 206 the client may receive the situation indication and instructions.

Once the video profile and situation are determined, transmission of the game starts, in which the server repeatedly transmits packets on step 208 and the client receives the packets on step 212.

On on-going step 216 the client may continuously detect defective situations, including packet disorder, missing packets or corrupted frames. The client may send notifications to the server in accordance with the situation or the notification instructions as last received from the server.

If the client experiences packet disorder which can be handled by keeping a buffer comprising for example 2-5 packets, then reordering is done and there is no need to communicate messages to the server. If, however, the situation is such that packet reordering cannot be done, since the missing packets do not arrive on time to fit into the buffer, i.e., they arrive after a gap larger than the buffer size, or do not arrive at all, the client may transmit messages to the server in accordance with the situation or instructions last received from the server, including missing packet notifications or corrupted frame notifications.

On step 220 the server may receive the notifications and on step 224 the server may send the required data, including but not limited to intra refresh macroblocks or retransmitted packets.

On step 228 the server may determine the situation, in accordance with the notifications or reports received for the client. If no notifications are received, the situation may be such that does not require data retransmissions, such as packet disorder. If notifications are received, the server may store the received notifications and their associated timeframes, and may determine whether the number of missed packets in a predetermined period of time is below a threshold, in which case a sporadic packet loss situation is determined, or above the threshold in which case a continuous packet loss situation may be determined. If continuous packet loss situation is in effect but the notification frequency does not drop enough, for example does not drop to below the threshold, then bitrate adaptation may take place in which the resolution may be adapted to the available bitrate.

On step 232, if the situation changed relatively to the last situation reported to the client, the server may notify the client of the situation or of the types of notifications to be transmitted.

On step 236 the client may receive the situation or the types of notifications to be transmitted.

The server may then continue to transmit packets on step 208 or to transmit the intra refresh macroblocks or retransmitted packets on step 224.

The client may continue to receive packets on step 212 and to detect or report to the server problematic situations such as corrupted frames or missing packets.

It will be appreciated that the flowchart refers only to aspects of the operation related to transmitting and receiving the information, and not to other aspects such as decoding, rendering or other aspects.

Figure 3:
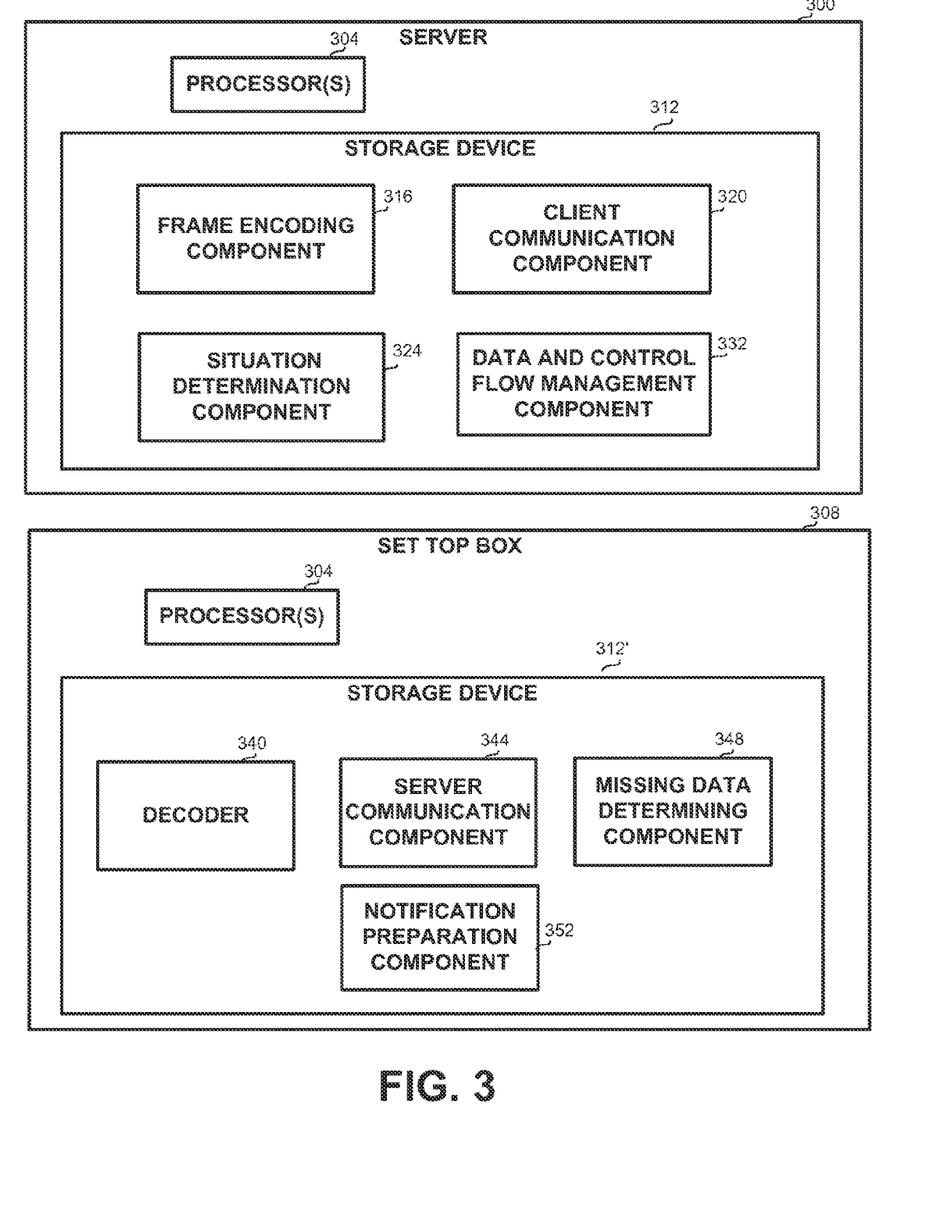
FIG. 3 shows a block diagram of an apparatus for over the top transmission, in accordance with some exemplary embodiments of the disclosed subject matter.

Referring now to FIG. 3, showing a block diagram of an apparatus for recovering lost data in media streaming.

The apparatus comprises a server 300 and a client 308, such as an STB, wherein server 300 may be located at a transmission station, and client 308 may be located at a subscriber's location such as a home, a business, or the like. In some embodiments, each server may provide services to a multiplicity of clients. In some embodiments, a client may receive services from one or more servers.

Server 300 and client 308 may be implemented as a computing device, which may comprise one or more processors 304, or loaded to and executed by such computing device. Any of processors 304 may be a Central Processing Unit (CPU), a microprocessor, an electronic circuit, an Integrated Circuit (IC) or the like. Alternatively, server 300 or client 308 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 304 may be utilized to perform computations required by server 300 or client 308 or any of their subcomponents.

In some embodiments, server 300 or client 308 may comprise one or more storage devices 312 or 312' for storing executable components, and which may also contain data during execution of one or more components. Each storage device 312 or 312' may be persistent or volatile. For example, storage device 312 or 312' can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, any storage device 312 or 312' may retain program code operative to cause any of processors 304 to perform acts associated with any of the steps shown in FIG. 2 above, for example encoding, decoding, determining situations, or the like.

The components detailed below may be implemented as one or more sets of interrelated computer instructions, executed for example by any of processors 304 or by another processor. The components may be arranged as one or more executable files, dynamic libraries, static libraries, methods, functions, services, or the like, programmed in any programming language and under any computing environment.

Storage device 312 of server 300 may comprise frame encoding component 316 for encoding frames in accordance with the used transmission protocol and encoding method. For example, when encoding with H.264 protocol, each frame may comprise a multiplicity of macroblocks, wherein each macroblock may be encoded based on changes relatively to the corresponding macroblock in a preceding frame. However, some frames which are significantly different from previous frames, for example in scene changes, may be encoded independently without being based on contents of previous frames. Frame encoding component 316 may encode frames in accordance with the current needs, e.g., if a packet has been lost then the next frames may be encoded with independent macroblocks which are independent on corresponding macroblocks in preceding frames, while in normal situations the frames may be encoded with the normal encoding method.

Storage device 312 of server 300 may further comprise client communication component 320 for transmitting information to one or more clients 308, including newly sent packets and packets retransmitted upon notifications from the client. The packets may be associated with a particular game, with a constant bitrate stream, or with any administrational task. Client communication component 320 may be further responsible for receiving notifications from one or more clients regarding corrupted frames or missing packets. Client communication component 320 may be further responsible for transmitting to client 308 the situation as determined by situation determination component 324 detailed below, or instructions for notifications the client is expected to transmit in the particular situation.

Storage device 312 of server 300 may further comprise situation determination component 324 for determining the situation upon the notifications received from client 308. If no missing data notification is received, situation determination component 324 may assume a default situation such as a packet disorder situation in which no data is required to be retransmitted by the server. If notifications are received, then situation determination component 324 nay determine the situation upon the notifications type and frequency.

Storage device 312 may also comprise data and control flow management component 332, for managing the information and control flow among the detailed components, for example, activating situation determination component at the required times, providing instructions to be transmitted to client communication component 320, or the like.

Storage device 312' of client 308 may comprise decoder 340 for decoding the received IP in accordance with the used protocol, including audio and video decoding. Thus, frames received during normal transmission when no packets have been notified as missing are decoded, as well as frames received after a notification has been sent.

Yet another component of storage device 312' may be server communication component 344 for communicating with client communication component 320 of server 300, for example receiving situation or instructions from server 300, sending one or more notifications to server communication component 320 that a packet has been lost or a frame is missing, or the like.

Storage device 312' may also comprise missing data determining component 348 for determining that one or more packets from the received IPs are missing thus corrupting one or more frames, or that one or more frames are otherwise corrupted.

Storage device 312' may comprise notification preparation component 352 for preparing one or more notification based upon the missing data as determined by missing data determining component 348 to be transmitted by server communication component 344 to client communication component 320 of server 300.

It will be appreciated that any subset of decoder 340, server communication component 344, missing data determining component 348 or notification preparation component 352 may be implemented as one or more component or a set of inter-related components.

It will be appreciated that each of the described server and client may comprise multiplicity of additional components responsible for additional functionalities as known or as will become known in the art.

The disclosed methods and apparatus are not limited to a particular field and may be used in any application in which it is required to maintain lost data recovery and low delay, wherein the information may be real-time information which may be generated prior to transmission.

The disclosed method and apparatus may operate with any encoding method that is currently known or that will become known in the future, such as but not limited to MPEG, ITU-T H264 recommendation, Joint Video Team of ISO/IEC MPEG, MPEG 2, H265, MP4 ITU-T VCEG, or any other currently known encoding method that may be effected by lost packets, or nay such method that will become known in the future.

It will be appreciated that the disclosed method, apparatus and computer program may apply with minimal changes to systems and methods in which parts of frames are manipulated such as slices rather than full frames.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:

receiving by a computing device associated with a server transmitting video, at least one notification from a client, the notification related to a missing packet or a corrupted frame, wherein the packet or the frame are to be received by the client;

dynamically determining a situation based upon the at least one notification; and subject to the situation being a first situation, transmitting to the client an indication that the client is to transmit to the server error notifications related to corrupted frames, and subject to the situation being a second situation, transmitting to the client an indication that the client is to transmit to the server error notifications related to corrupted frames and error notifications related to lost packets.

2. The computer-implemented method of claim 1, wherein in a third situation the client is not to transmit error notifications to the server.

3. The computer-implemented method of claim 2, wherein the third situation is a packet mis-order situation and the client maintains a buffer for handling disordered packets.

4. The computer-implemented method of claim 1, wherein in a fourth situation the server adjusts transmission bitrate and resolution.

5. The computer-implemented method of claim 1, wherein the first situation is a sporadic packet loss situation and the second situation is continuous packet loss situation.

6. The computer-implemented method of claim 5 wherein a third situation is a packet reordering situation and a fourth situation is a bitrate adaptation situation.

7. A computer-implemented method performed by a computerized device associated with cloud-gaming, comprising:
receiving by a computing device associated with a server transmitting video, at least one notification from a client, the notification related to a missing packet or a corrupted frame;
dynamically determining a situation based upon the at least one notification; and
assuming the situation, and based on the situation, determining a transmission bitrate and resolution of transmission to the client, wherein the situation is selected from the group consisting of:
a packet mis-order situation in which the client maintains a buffer for handling disordered frames;
a sporadic packet loss situation in which the client is to transmit error notifications about corrupted frames and the server is to transmit intra-refresh of macroblocks;
a continuous packet loss situation in which the client is to transmit error notifications about corrupted frames and about lost packets and the server is to transmit intra-refresh of macroblocks and the lost packets; and
an average bitrate reduction situation in which the server adjusts transmission bitrate and resolution.

8. An apparatus having a processing unit and a storage device, the apparatus comprising:
a frame encoding component for encoding frames to be transmitted to a client;
a situation determination component for dynamically determining a situation, based upon an error notification received from a client, the error notification related to a missing packet or a corrupted frame; and
a client communication component for:
transmitting the encoded frames to the client;
receiving the error notification from the client;
subject to the situation being a first situation transmitting to the client an indication that the client is to transmit to the server error notifications related to corrupted frames, and
subject to the situation being a second situation, transmitting to the client an indication that the client is to transmit to the server error notifications related to corrupted frames and error notifications related to lost packets; and
transmitting data to the client upon receiving the notification.

9. The apparatus of claim 8, wherein in a third situation the client is not to transmit error notifications to the server.

10. The apparatus of claim 9, wherein the third situation is a packet mis-order situation and the client maintains a buffer for handling disordered packets.

11. The apparatus of claim 8, wherein in a fourth situation the server adjusts transmission bitrate and resolution.

12. The apparatus of claim 8, wherein the first situation is a sporadic packet loss situation, and the second situation is a continuous packet loss situation.

13. The apparatus of claim 12 wherein a third situation is a packet reordering and a fourth situation is a bitrate adaptation situation.

14. A computer program product comprising:
a non-transitory computer readable medium;
a first program instruction for receiving by a computing device associated with a server transmitting video, at least one notification from a client, the notification related to a missing packet or a corrupted frame, wherein the packet or the frame are to be received by the client;
a second program instruction for dynamically determining a situation based upon the at least one notification; and
a third program instruction for, subject to the situation being a first situation, transmitting to the client an indication that the client is to transmit to the server error notifications related to corrupted frames, and, subject to the situation being a second situation, transmitting to the client an indication that the client is to transmit to the server error notifications related to corrupted frames and error notifications related to lost packets,
wherein said first, second and third, and eighth program instructions are stored on said non-transitory computer readable medium.

* * * * *